United States Patent Office 3,479,884
Patented Nov. 25, 1969

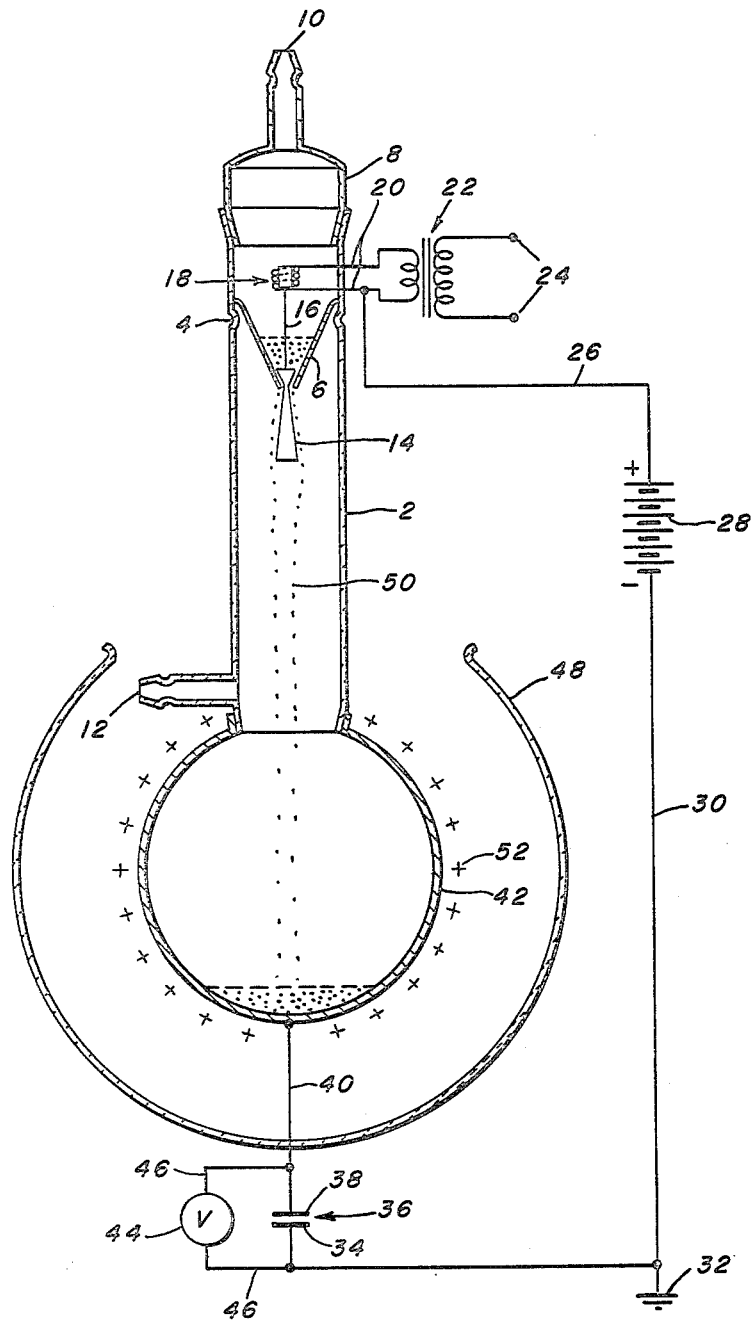

3,479,884
METHOD AND APPARATUS FOR MEASURING SPECIFIC SURFACE AREA OF POWDERS
Paul Imris, 507 Pittsburgh St., Springdale, Pa. 15144
Filed Aug. 15, 1967, Ser. No. 665,664
Int. Cl. G01f 15/14; G01j 5/04
U.S. Cl. 73—432    4 Claims

ABSTRACT OF THE DISCLOSURE

The method of measuring the specific surface area of powders comprising the steps of electrostatically charging the particles of a weighed sample of the powder, collecting the charged particles in a conductive receptacle, and measuring the electric potential acquired by a condenser connected between this receptacle and ground. The specific surface area is then calculated using the following formula $$S = \frac{4\pi \left(\frac{CV_1}{4\pi E_0 V_2}\right)^2}{W}$$

where:
$V_1$ = the potential developed across the condenser,
$V_2$ = the potential to charge the particles,
$C$ = the capacity of the condenser,
$W$ = the weight of the sample,
$E$ = the permittivity of the gas or vacuum.

BACKGROUND OF THE INVENTION

Field of the invention

This invention relates to a method of measuring the specific surface area of powdered material and to apparatus for use in the practice of such method.

Description of the prior art

There has been of late a great deal of interest in the use of powdered materials of various sorts for different purposes. The field of powder metallurgy has been quite active, and uses are developing for powdered refractory materials and powdered polymer materials. For many of the purposes for which the powdered materials are to be used, it is of at least some importance to determine the specific surface area of the powder, i.e., the ratio between its weight and the surface area of its particles. The more finely divided the material, the higher the specific surface area.

In some instances, it is known that the use of a powder with a specific surface area falling within certain limits or exceeding a certain value is critical to the achievement of certain desired properties. For example, in an article in the Journal of the Society of Dyers and Colourists, vol. 80, pages 521–526 (October 1964), E. Atherton et al. describe a method for determining the particle size distribution in vat dyes and teach that freedom from particles greater than 3 to 5 microns leads to distinct advantages in quality of dyeing, especially in penetration and surface appearance, and gives greater freedom from speckiness. In many other instances, the progress of the art has been impeded by the fact that the time and the expense of the equipment required for making a specific-surface determination has precluded the making of such determinations on a routine basis, with the result that improvements in various practices that might be achieved by the routine use of specific-surface determinations have gone undiscovered.

The foremost of the specific-surface determination techniques of general application is the gas-adsorption or BET method, which involves determination of the amount of helium or nitrogen adsorbed on the surface of the particles. The method requires relatively expensive equipment and gives results that vary, from run to run, by about plus or minus 10%. There is reason to believe, moreover, from similar tests run upon specimens of known surface area, that the results from the BET method are actually about 10% to 15% low.

Various other methods for the determination of specific surface area of powders are known, but they are similarly rather inaccurate, require expensive equipment, require calibration, or have other similar drawbacks. Among these may be mentioned the following: (1) electrolyte voltage-drop-change, (2) centrifugal line-start particle-size determinations, (3) low-pressure permeametry, (4) flow ultramicroscope techniques, (5) double-layer capacitance, (6) metallographic examination, (7) small-angle X-ray scattering analysis, and (8) turbimetric sedimentation.

SUMMARY OF THE INVENTION

The specific surface area of powdered material is determined by providing individual particles of the weighed samples of powder with an electrostatic charge, collecting the charged particles in a metal sphere, and then measuring the charge imparted to the sphere. Values accurate to within about plus or minus 2% are obtained. The method is absolute, rather than relative (requiring calibration), and it may be practiced with relatively inexpensive equipment by an operator with relatively little skill or training.

BRIEF DESCRIPTION OF THE DRAWING

A complete understanding of the invention may be obtained from the foregoing and following description thereof, taken together with the accompanying drawing, the sole figure of which is a schematic diagram of apparatus in accordance with the invention, for use in practicing the method of the invention.

DESCRIPTION OF THE PREFERRED EMBODIMENTS

As shown in the figure, apparatus for practicing the present invention comprises a glass tube 2 provided with an indentation 4 for supporting a sample holder 6 and closed at its upper end with a cap 8 having an opening 10 for the inflow of gas. The tube 2 further comprises a gas outlet 12. Nearly closing the bottom of the sample holder 6 is an electrode 14, which is electrically connected by a line 16 to an electromagnetic vibrator 18 supported within the tube 2 by suitable means (not shown) and powered by means of leads 20 and an insulated transformer 22, the primary of which is supplied with current through the leads 24. Connected to the secondary of the transformer 22 is a line 26, which is connected to a direct current voltage source 28 capable of generating a suitable potential, such as about 10,000 volts. To the other side of the direct current voltage source 28 is connected a line 30 that is preferably grounded as at 32 and is connected to one plate 34 of a condenser 36. The other plate 38 of the condenser 36 is connected by a line 40 to a metal sphere 42, which, as shown, is connected to the bottom of the glass tube 2. A voltmeter 44 is connected by lines 46 across the condenser 36. To help to stabilize the electrostatic charge on the exterior of the sphere 42, there is preferably also provided a generally spherical glass member 48.

The equipment described above may be operated as follows. With the electromagnetic vibrator 18 not running, a weighed sample of powder material, the specific surface area of which is to be determined, is placed in the sample holder 6. The cap 8 is placed on the glass tube 2, and the system is then flushed with a suitable inert gas, such as helium. The use of such an inert atmosphere favors obtaining good electrostatic conditions within the apparatus, but is not absolutely essential, it being possible to operate the system with the tube 2 evacuated or containing other gas, such as air. The voltage source 28 is connected to the condenser 36 and the lead 20, and then the electromagnetic vibrator 18 is activated, so as to cause particles 50 of the powder material to travel along the electrode 14 and acquire an electrostatic charge, and then fall into the metal sphere 42. The amount of charge acquired by an individual particle 50 is dependent upon its surface area. As a result, the surface of the metal sphere 42 becomes charged with static electricity, as indicated at 52, developing a potential that charges the condenser 36. Condenser 36 is preferably of low capacity, such as about 100 picofarads. The operation continues until the entire sample has been electrostatically charged and discharged, as described above. At this point, the voltmeter 44 is read, yielding a value indicative of the specific surface of the powder sample. To be more precise, the specific surface area of the powder may be calculated in accordance with the equation:

$$S = \frac{4\pi \cdot \left(\frac{C \cdot V_1}{4\pi \cdot E_0 \cdot V_2}\right)^2}{W}$$

where:

S = the specific surface area of the powder in square meters per gram,
$\pi = 3.1416$,
C = the capacity of the condenser in picofarads,
$V_1$ = the potential read by the voltmeter 44 in volts,
$V_2$ = the potential of the voltage source 28 in volts,
$E_0$ = the permittivity of the gas or vacuum in the apparatus, and
W = the weight of the sample in grams.

The method of the invention has been applied to the determination of the specific surface area, in square meters per gram of various substances, with the results indicated below in Table I. In most instances, samples of the same material were also subjected to specific-surface-area analysis by the known BET method, with results that are also shown in Table I.

TABLE I.—COMPARISON OF RESULTS
[Specific surface area, meter ²/gram]

| Material | Method of this invention | | | BET Method | |
|---|---|---|---|---|---|
| | Run I | Run II | Run III | Run I | Run II |
| $UO_2$ | 5.235 | 4.381 | 5.295 | 4.50 | 3.80 |
| $U_3O_8$ | 2.721 | 2.561 | 2.682 | 1.80 | 2.30 |
| $ThO_2$ | 0.531 | 0.498 | 0.556 | 0.74 | 0.38 |
| $ZrO_2$ | 2.013 | 2.036 | 2.120 | 1.80 | 1.99 |
| Cement | 1.513 | 1.580 | 1.601 | 1.05 | 1.60 |
| $Al_2O_3$ | 5.010 | 5.109 | 5.130 | 4.80 | 5.50 |
| Activated charcoal | 38.380 | 38.625 | 39.005 | 35.00 | 37.20 |
| Activated charcoal | 95.900 | 94.386 | 95.40 | | |

As can be seen from the above results, the values obtained with the method of the invention show substantially greater reproducibility. Moreover, the values obtained with the use of the method of the invention, as compared with the averages of the values obtained with the use of the BET method, are about 10% to 15% higher; as mentioned above, those skilled in the art have had reason to believe that the BET method yields results that are about 10% to 15% low, and the results obtained with the method of this invention tend to confirm this.

In work done by the applicant, satisfactory results have been obtained using a glass tube 2 having a diameter of about 5 centimeters and a metal sphere 42 having a diameter of about 20 centimeters, but it will be apparent to those skilled in the art that equipment of other dimensions may be used to suit particular circumstances. In work with particles less than 1 micron in average diameter, it is important to obtain optimal operation to use a vacuum of approximately $10^{-4}$ millimeters of mercury. Moreover, the method of this invention is not limited to the use of an electromagnetic vibrator, as other means for imparting the desired charge to the indivdual particles of the sample will suggest themselves to persons skilled in the art, such as an Archimedes screw arrangement or other suitable means operatively associated with the sample holder.

While I have shown and described herein a certain embodiment of my invention, I intend to cover as well any change or modification therein which may be made without departing from the spirit and scope of the invention.

I claim as my invention:

1. A method of measuring the specific surface area of a powder material, said method comprising the steps of electrostatically charging substantially all of the particles comprising a weighed sample of said powder material, collecting said particles in a member of conductive material to generate an electrical potential on the exterior thereof, and measuring said electrical potential.

2. A method as defined in claim 1, characterized in that the step of charging substantially all of said particles of said weighed sample comprises bringing said particles into contact with an electrode maintained at a high potential operatively associated with a holder containing said weighed example.

3. Apparatus for use in determining the specific surface area of powder material, said apparatus comprising, in combination, means for imparting an electrostatic charge to substantially all of the particles in a weighed sample of said powder material, electrically conductive means for collecting said particles after said electrostatic charge has been imparted to them and for developing on the exterior thereof an electrical potential corresponding to the sum of the electrostatic charges imparted to said particle, and means for measuring said potential.

4. Apparatus as defined in claim 3, characterized in that said means for imparting an electrostatic charge to said particles comprises a sample holder having a mouth, an electromagnetic vibrator, an electrode fitting within said mouth, and means electrically and mechanically connecting said electrode to said vibrator.

References Cited

UNITED STATES PATENTS 2,656,508   10/1953   Coulter.

FOREIGN PATENTS 708,745   5/1965   Canada.

LOUIS R. PRINCE, Primary Examiner

J. W. ROSKOS, Assistant Examiner

U.S. Cl. X.R.

73—38